United States Patent
Poupyrev et al.

(10) Patent No.: US 7,952,566 B2
(45) Date of Patent: May 31, 2011

(54) APPARATUS AND METHOD FOR TOUCH SCREEN INTERACTION BASED ON TACTILE FEEDBACK AND PRESSURE MEASUREMENT

(75) Inventors: Ivan Poupyrev, Tokyo (JP); Shigeaki Maruyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 763 days.

(21) Appl. No.: 11/831,703

(22) Filed: Jul. 31, 2007

(65) Prior Publication Data

US 2008/0024459 A1  Jan. 31, 2008

(30) Foreign Application Priority Data

Jul. 31, 2006  (JP) .................. 2006-208047

(51) Int. Cl.
  *G06F 3/041* (2006.01)
(52) U.S. Cl. ........................ 345/173; 715/701
(58) Field of Classification Search .......... 345/173–178; 178/18.01–18.11, 19.01–19.07, 20.01–20.04; 715/700–702
See application file for complete search history.

(56) References Cited

U.S. PATENT DOCUMENTS

| | | | |
|---|---|---|---|
| 7,683,889 B2* | 3/2010 | Rimas Ribikauskas et al. | 345/173 |
| 2001/0035854 A1* | 11/2001 | Rosenberg et al. | 345/156 |
| 2004/0021643 A1* | 2/2004 | Hoshino et al. | 345/173 |
| 2005/0259087 A1* | 11/2005 | Hoshino et al. | 345/173 |
| 2006/0119586 A1* | 6/2006 | Grant et al. | 345/173 |
| 2006/0132457 A1* | 6/2006 | Rimas-Ribikauskas et al. | 345/173 |
| 2006/0146039 A1* | 7/2006 | Prados et al. | 345/173 |

FOREIGN PATENT DOCUMENTS

| | | |
|---|---|---|
| JP | 2003-016502 | 1/2003 |
| JP | 2005-190290 | 7/2005 |
| JP | 2006-048302 | 2/2006 |
| WO | WO 0154109 A1 * | 7/2001 |

* cited by examiner

*Primary Examiner* — Amare Mengistu
*Assistant Examiner* — Dmitriy Bolotin
(74) *Attorney, Agent, or Firm* — Oblon, Spivak, McClelland, Maier & Neustadt, L.L.P.

(57) ABSTRACT

An apparatus includes a display section with a touch screen, and the touch screen is adapted to display at least one graphical user interface object and detect a touch position on the touch screen. The apparatus has a haptic feedback generating unit attached to the touch screen and is adapted to generating haptic feedback. A pressure sensing unit is attached to the touch screen and adapted to detect pressure applied to the touch screen. A controller section is adapted to control and drive the display section. The graphical user interface object displayed on the touch screen has a plurality of logical states. The controller section determines a current logical state of the graphical user interface object and a form of the haptic feedback to be generated depending on the detected touch position.

18 Claims, 11 Drawing Sheets

APPARATUS AND METHOD FOR TOUCH SCREEN INTERACTION BASED ON TACTILE FEEDBACK AND PRESSURE MEASUREMENT

BACKGROUND OF THE INVENTION

1. Field of the Invention

The present invention relates to a method of a user interface utilizing a touch screen and tactile feedback, and an apparatus that employs such a user interface method.

2. Discussion of the Related Art

Japanese Patent Application Publication No. 2003-016502 discloses an example of such a user interface system for detecting a position of a user's finger or a pointing device on the touch screen of a display device. In this user interface system, the tactile feedback are provided by vibrating the touch screen when the user touches one of graphical user interface objects displayed on the touch panel. A functionality assigned to the selected graphical user interface object is actuated when the user releases or detouches the finger or pointing device from the touch screen.

Japanese Patent Application Publication No. 2005-190290 discloses another example of a user interface system capable of providing tactile feedbacks when a user touches on a touch screen. In this user interface system, the initial tactile feedback is provided when the user first touches the touch panel, and a different tactile feedback is provided when the touch position is moved to a region of the touch screen where a graphical user interface object is displayed. A function assigned to the selected graphical user interface object is actuated when the user detouches the finger or pointing device or presses for a longer period of time. The actuation of the selected graphical user interface object is notified to the user in a form of tactile feedback, color change of the graphical user interface object, sound or combination thereof.

Minsky, M., "Manipulating simulated objects with real-world gestures using force and position sensitive screen". Proceedings of SIGGRAPH'84. 1984: ACM: pp. 195-203 discloses still another example of a user interface system in which a pressure sensor is added to a touch screen for detecting pressure applied to the touch screen, allowing more flexibility in the user interface operation.

SUMMARY OF THE INVENTION

It is desirable to provide tactile notification when a user touches a user interface element on a touch screen without executing functionality of the user interface element. Furthermore, it is desirable to provide tactile notification to the user when the functionality of the user interface element is executed.

Furthermore, it is desirable to provide a method of user interface utilizing a touch screen display device capable of providing tactile feedback and measuring pressure applied to the touch screen, thereby allowing a user to have interactive operations similar to ones with physical operation means, such as pressing buttons or keys. Further, it is also desirable to provide an apparatus that employs such a user interface method.

The present invention is made in view of the forgoing issues described above.

In an embodiment of the present invention, there is provided an apparatus including a display section with a touch screen. The touch screen is configured to display at least one graphical user interface object and detect a touch position on the touch screen. The touch position is inputted with a user's finger or a pointing device. The apparatus includes: a haptic feedback generating unit attached to the touch screen and generating haptic feedback; a pressure sensing unit attached to the touch screen and detecting pressure applied to the touch screen; and a controller section configured to control and drive the display section. The graphical user interface object displayed on the touch screen has a plurality of logical states. The controller section determines a current logical state of the graphical user interface object using a history of detected touch positions and a history of detected pressure values. The controller section determines a form of the haptic feedback to be generated depending on (i) the detected touch position, (ii) the detected pressure value and (iii) the determined current logical state of the graphical user interface object.

In another embodiment of the present invention, the haptic feedback generating unit may generate different tactile feedback for different logical states of the GUI object.

In another embodiment of the present invention, the logical states of the GUI object may include at least a selected state and an actuated state. The controller section may determine that the graphical user interface object is in the actuated state if a pressing event is recognized. The controller section may recognize the pressing event using a history of the detected pressure value. Alternatively, the controller section may determine that the GUI object is in the actuated state if: (i) the touch position is inside of the GUI object; and (ii) the detected pressure is more than a preset actuation threshold value. In another example, the controller section may determine that the GUI object is in the actuated state if: (i) the touch position is inside of the GUI object; and (ii) a history of the detected pressure satisfies a preset actuation condition. In the present embodiment, the logical state of GUI object is allowed to change to the actuated state only after the selected state.

In another embodiment of the present invention, the haptic feedback generating unit may include a single or plurality of piezoelectric elements. At least one of the piezoelectric elements may be used for generating the haptic feedback and detecting the pressure applied by the user. Alternatively, the at least one of the piezoelectric elements may generate the haptic feedback and detect the pressure in time sharing manner.

In another embodiment of the present invention, the haptic feedback is controlled in either a frequency, an amplitude or both amplitude and frequency simultaneously.

In another embodiment of the present invention, the haptic feedback generating unit may generate a continuous haptic feedback as long as the touch position is inside of the GUI object. Further, the continuous tactile feedback is changed in response to a change of the pressure applied to the touch screen. The change of the continuous tactile feedback depends on the current logical state of the graphical user interface object.

In another embodiment of the present invention, the haptic feedback generating unit may generate a single burst of the haptic feedback when the touch position crosses over a hotspot predefined within the GUI object. Alternatively, the haptic feedback generating unit may generate a single burst of the tactile feedback when the touch position or the detected pressure changes more than a preset threshold value In another embodiment of the present invention, the GUI object may be formed with a plurality of sub-elements, and the haptic feedback generating unit may generate different tactile feedbacks for different sub-elements thereof.

In another embodiment of the present invention, the controller section may determine that the GUI object is in the activated state by using a plurality of pressure thresholds.

In another embodiment of the present invention, the controller section may differentiates a stronger push and a lighter push based on a noise level of a signal output from the touch screen or a circuitry thereof, the stronger push corresponding to the pressing event, the lighter push corresponding to sliding of the user's finger or pointing device.

In another embodiment of the present invention, the display section may generate visual feedback in correlation with the haptic feedback.

In another embodiment of the present invention, a graphical user interface method for a touch screen is provided. The method includes: displaying a graphical user interface object on the touch screen, the graphical user interface object having a plurality of logical states; detecting a touch position on the touch screen, at which a user's finger or a pointing device is touching; detecting pressure applied on the touch screen when the touch position is detected; and generating haptic feedback in response to the touching, a form of the haptic feedback being determined depending on (i) the detected touch position, (ii) the detected pressure value and (iii) a current logical state of the GUI object. The current logical state of the GUI object is determined by using a history of detected touch positions and a history of detected pressure values.

In the embodiments of the present invention, the form of the haptic feedback is determined depending on the touch position, the pressure applied by the user and the current logical state of the graphical user interface object. Accordingly, various forms of the haptic feedback may be provided for different logical states of the graphical user interface object, making it easy for the user to know the current state of the graphical user interface object.

ADVANTAGES OF THE INVENTION

The present invention makes it possible to provide tactile notification when a user touches a user interface element on a touch screen without executing functionality of the user interface element, and tactile notification to the user when the functionality of the user interface element is executed.

Furthermore, according to the present invention, a method of user interface utilizing a touch screen display device capable of providing tactile feedback and measuring pressure applied to the touch screen is provided. The method allows a user to have interactive operations similar to ones with physical operation means. Further, according to the present invention, an apparatus that employs such a user interface method is provided.

BRIEF DESCRIPTION OF THE DRAWINGS

A more complete appreciation of the invention and many of the attendant advantages thereof will be readily obtained a the same becomes better understood by reference to the following detailed description when considered in connection with the accompanying drawings, wherein:

FIG. 5(*b*) is an explanatory illustration of a user interface method according to another embodiment of the present invention for a case where a pressing event is recognized;

FIG. 5(*c*) is an explanatory illustration of a user interface method according to another embodiment of the present invention for a case where a pressing event is recognized;

FIG. 7(*b*) is a schematic diagram showing an example of hotspot in a GUI object;

FIG. 7(*c*) is a schematic diagram showing an example of hotspot in a GUI object;

FIG. 7(*d*) is a schematic diagram showing an example of hotspot in a GUI object;

FIG. 10(*b*) is an explanatory illustration of a user interface method according to an embodiment of the present invention for a slider-type GUI object;

FIG. 10(*c*) is an explanatory illustration of a user interface method according to an embodiment of the present invention for a slider-type GUI object;

FIG. 10(*d*) is an explanatory illustration of a user interface method according to an embodiment of the present invention for a slider-type GUI object.

DESCRIPTION OF PREFERRED EMBODIMENTS

Below embodiments of the present invention will be described with reference to the accompanying figures. In the following description, some terminology is used to describe certain characteristics of the present invention.

The term "touch screen" is a transparent screen-type position sensing device capable of detecting a touch position on the screen surface, at which a user's finger or any pointing device is touching.

The term "logical states of a graphical user interface object" means distinct states of a graphical user interface object, by which different corresponding operations or processing are triggered. The logical states includes at least a selected state which indicates the graphical user interface object is selected by a user but none of the corresponding operation or operation is triggered, and an actuated state in which the corresponding operations or processing is performed.

Figure 1:
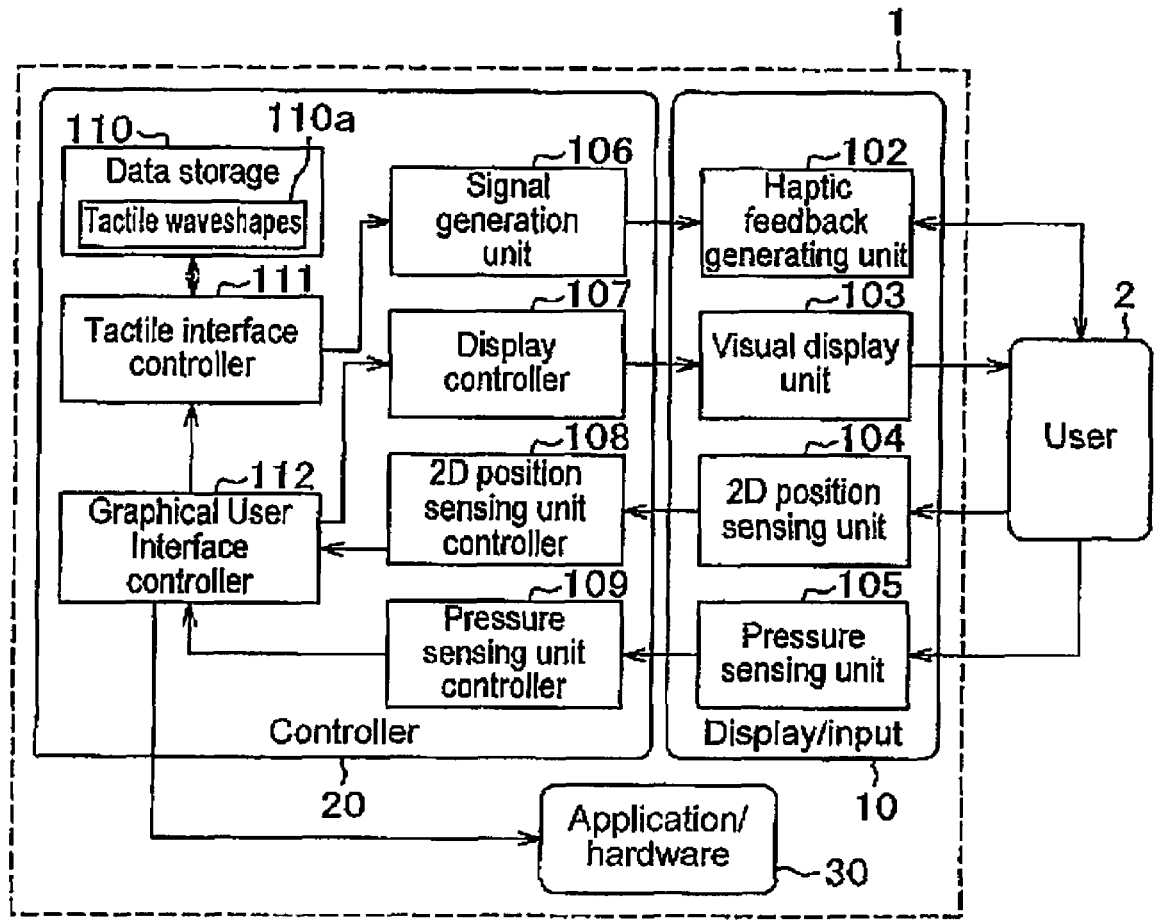
FIG. 1 is a block diagram showing an example of an apparatus configuration according to an embodiment of the present invention.

FIG. 1 shows an example of an apparatus to which a user interface method according to an embodiment of the present invention is applied. The apparatus 1 includes a display/input section 10, a controller section 20 and an application section 30.

The display/input section 10 displays on a touch screen thereof images of buttons, keys, switches or any other Graphic User Interface (GUI) objects to prompt a user 2 to interact with the apparatus 1. The display/input section 10 further detects a touch position of a user's finger or a pointing device on the screen and pressure applied when the finger or pointing device touches the screen. The display/input section 10 further provides different types of tactile feedback in response to the user's input operation.

It should be noted, in this specification, that the word "tactile" and "haptic" indicate the same sensory effect and are used interchangeably.

The control section 20 dynamically correlates: (i) the touch position on the screen or a GUI object selected by the user's input operation; (ii) the pressure applied on the screen by the user's input operation; and (iii) a current logical state of the selected GUI object; with the type of tactile feedback to be presented to the user 2.

The application section 30 performs various operations or functions in response to the user's input operation detected by the display/input section 10. The application section 30 may include various applications and software units or hardware.

(1) Display/Input Section

The display/input section 10 includes a haptic feedback generating unit 102, a visual display unit 103, a two-dimensional (2D) position sensing unit 104 and a pressure sensing unit 105.

The visual display unit 103 presents visual information to the user 2. Such visual information may include various predefined GUI objects that user can interact with, such as images of buttons, sliders, drawing, scroll bars, hyper links and etc. The visual display unit 103 may be formed with any type of display as long as it can be used with the tactile feedback generating unit 102, the 2D position sensing unit 104 and the pressure sensing unit 105. For example, a Liquid Crystal Display (LCD), a Organic Light Emitting Diode (OLED) display or the like may be employed as the visual display unit 103.

The haptic feedback generating unit 102 may be formed with piezoelectric bimorph actuators with single or multiple layer structure. Examples of such actuators for generating the tactile feedback are disclosed in Japanese Patent Application Publication No. 2006-48302. Alternatively, various types of mechanical or electrical or electromagnetic actuators/motors may be employed to generate the tactile feedback depending on a size/mass of the display and/or available power.

The pressure sensing unit 104 allows to measure pressure applied to the touch screen by the user's input operation. In the present embodiment, various types of pressure sensing units may be employed as long as such devices can measure the pressure of the user's touch with a predetermined resolution and be incorporated in the display/input section 10 with other units 102-104. For example, a force sensitive circuit elements such as strain gauges or pressure sensitive resistors may be used to sense the force which the touch screen member exerts on each support of the touch screen when finger pressure is applied to the member.

Alternatively, the piezoelectric actuators may be used to measure the pressure applied to the touch screen. For example, the piezoelectric actuators may be connected with a driver circuit and a detector circuit so as to use some of the actuators for generating the tactile feedback and the others for measuring the pressure applied thereon, respectively. An example of such a pressure sensing unit formed with the piezoelectric actuators is disclosed in Japanese Patent Application Publication No. 2006-48302. Alternatively, the driving of the actuators and measuring of the pressure may be performed time sharing manner. More specifically, a single actuator may be used with a switching circuit for measuring pressure and generating the feedback.

The 2D position sensing unit 105 detects where the user is touching on the touch screen. Any type of a touch screen or touch panel technology may be used as the 2D position sensing unit 105 as long as the touch screen/panel can measure two-dimensional position of the user's finger or pointing device. For example, a resistive touch screen, a capacitive touch screen, a surface acoustic wave touch screen, or the like may be used.

(2) Controller Section

The controller section 20 drives and controls sub-sections of the display/input section 10 in response to the user's input operation detected by the display/input section 10. The controller section 20 controls the display/input section 10 to change the tactile feedback depending on the position, pressure of the user's touch on the screen and the current logical state of GUI object, attempting to simulate the interactive operations with physical interface objects. Accordingly, the apparatus of the present embodiment allows the user to easily and intuitively perform input operations even without the physical user interface objects.

The control section 20 and the application section 30 may be embodied with a computer (not shown in the figure), which may include a CPU, a memory, an external data storage, and an input/output interface. Various functions performed by sub-sections of the control section 20 and the application section 30 may be realized by executing corresponding software installed in the computer, or adding dedicated circuitry or hardware to the computer. The application section 30 may include any application software or hardware that may be controlled in response to the user's input operations detected by the display section 20.

The software may be installed into the computer via a recording medium or a carrier signal. The software may also be installed by downloading from a server on a network or Internet through wired or wireless connection.

The controller section 20 includes a signal generating unit 106, a display controller 107, a two-dimensional (2D) position sensing unit controller 108, a pressure sensing unit controller 109, a data storage 110, a tactile interface controller 111, and a graphical user interface (GUI) controller 112.

The signal generating unit 106 generates and provides a signal to the tactile feedback generating unit 102 for driving tactile feedback generating elements or the piezoelectric actuators. The signal may be a voltage function of time, with amplitude, shape and period changed in response to the position and/or pressure of the user's input operation on the screen of the display/input section 10. Examples of output signal are a square wave, sinusoidal and so on. In the present embodiment, the type of signal is not limited to the above-described examples. Other signals may also be employed providing that the signal can be used to generate and change the tactile feedback in response to the user's input operation.

The tactile feedback generating unit 102 receives the input signal and converts the input signal into force patterns that are transmitted to the user 2 via a mechanical assembly that combines the screen with the tactile feedback generating elements or the piezoelectric actuators. The user 2 can feel the force patterns when the user 2 is touching the screen.

For the user's input operation, a pen-type pointing device may be used for selecting an image on the screen instead of the user's own finger. The user input to the apparatus 1 may be detected using a) touch screen technology where the user 2 can directly touch the screen with their fingers, or b) pen input technology where the pen-type devices are used to report a position where the user 2 is touching the screen.

The pressure sensing unit controller 109 determines the value of pressure applied when the user is touching on the screen. The position sensing unit controller 108 determines the position where the user 2 is touching on the screen. The determined data is communicated to the GUI controller 112.

When the user presses the screen and at the same time tactile feedback is provided to the user, the pressure signal will have a component from the tactile feedback signal. This signal may be filtered out because the exact shape of the signal is known. Alternatively, the pressure may be measured only at the point of time when no the tactile feedback is provided, i.e. when the tactile feedback waveshape is at zero value.

The GUI controller 112 determines which GUI object the user 2 is intending to interact with. Further, depending on a) the current state of the GUI object and b) pressure value applied to the GUI object, the GUI controller 112 determines an appropriate change in the state of the GUI object. For example, if the GUI object is a graphical button, the GUI controller 112 can calculate is there was enough pressure applied on the graphical button on the screen to change the state of the button from "free" to "pressed" or "non-actuated" to "actuated". After determining the state of the GUI objects, the GUI controller 112 changes the visual state of GUI object by sending commands to the display controller 107.

Alternatively, sound or audio alarm may be generated when the visual state of the GUI object changed so as to inform the user 2 about the change in the state of GUI object The GUI controller 112 further sends the commands to the tactile interface controller 111 that generates appropriate commands for driving the tactile signal generation unit 102. The data for tactile feedback may be generated algorithmically by the signal generation unit 106 as well as stored as data 110a on the data storage 110. Any widely available data storage devices may be used as the data storage 110 including flash memory, ROM, hard drive as well as network storage. Any file systems can be used to organize data on the data storage 110.

In another embodiment of the present invention, a history of the previous input and a history of the previous states of the GUI objects is used to determine the tactile feedback to the user 2.

Figure 2:
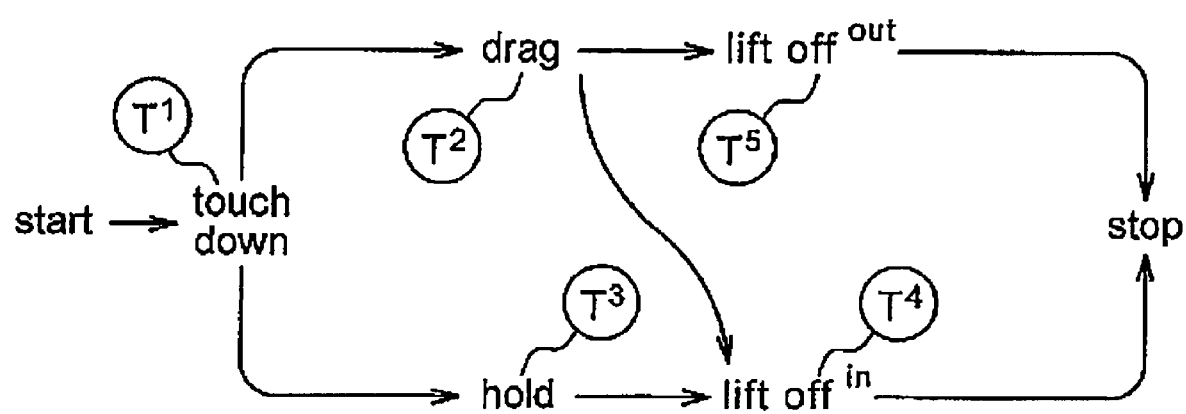
FIG. 2 is a schematic diagram showing an example of interaction with touch screens of prior art.

Before describing further details of embodiments of the present invention, a short description of touch-screen interaction operation of related art might be useful and provided below:

FIG. 2 presents an example of a typical touch-screen interaction of related art. The interaction starts when the user 2 touches the screen (touch down event T1). The user 2 can then either drag a finger across the input space (drag or slide state T2) or hold it steady in one place (hold state T3). Further, the user 2 can lift the finger off the screen, which can happen either from inside of the GUI object (lift off in event T4) or from outside of the GUI object (lift off out event T5).

Therefore, each GUI object can be in the following states: 1) neutral; 2) selected: that is when the user 2 selects the GUI object by touching it, such as placing the finger or pen-type device inside of the GUI object; and 3) activated, that is when the user 2 indicates that the GUI object should execute an associated command, corresponding to pressing of a physical button. In additional to these states, the GUI object can also be inactive, meaning that it can not be actuated, but it may or may not respond to the user input.

It should be noted that, in the related art technology, the user 2 can select a GUI object and then actuate it or return the GUI object into the neutral state, by moving the finger/pen outside of the GUI object and lifting the finger/pen. Such interaction method of the related art technology is different from what the user typically would do with the physical button while the user 2 typically presses the physical button to actuate.

Further, in all these cases the user 2 exerts a certain amount of pressure on the screen. It is desirable to provide different levels of the tactile feedback with a GUI object depending on the pressure applied on the GUI object. Furthermore, it is desirable to provide the user interface mechanism capable of realizing more intuitive interaction method that is closer to the interaction with the physical controllers.

In an embodiment of the present invention, the pressure and tactile feedback are used to separate two modes of the interaction with the screen:

a) the user feels GUI objects with tactile feedback, which selects items but not actuates them.

b) the user can actuate GUI objects by pressing on them stronger, the actuation is also accompanied with tactile feedback.

Figure 3:
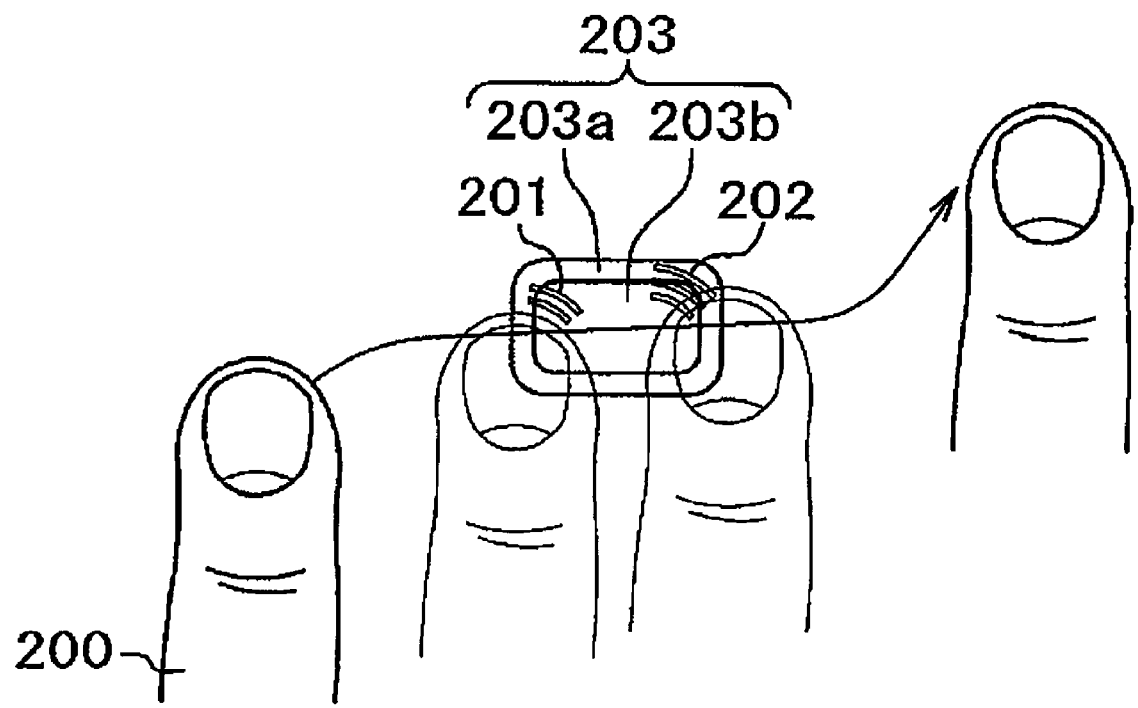
FIG. 3 is an explanatory illustration of a user interface method according to an embodiment of the present invention for a case where a user finger slides over a GUI object.
Figure 4:
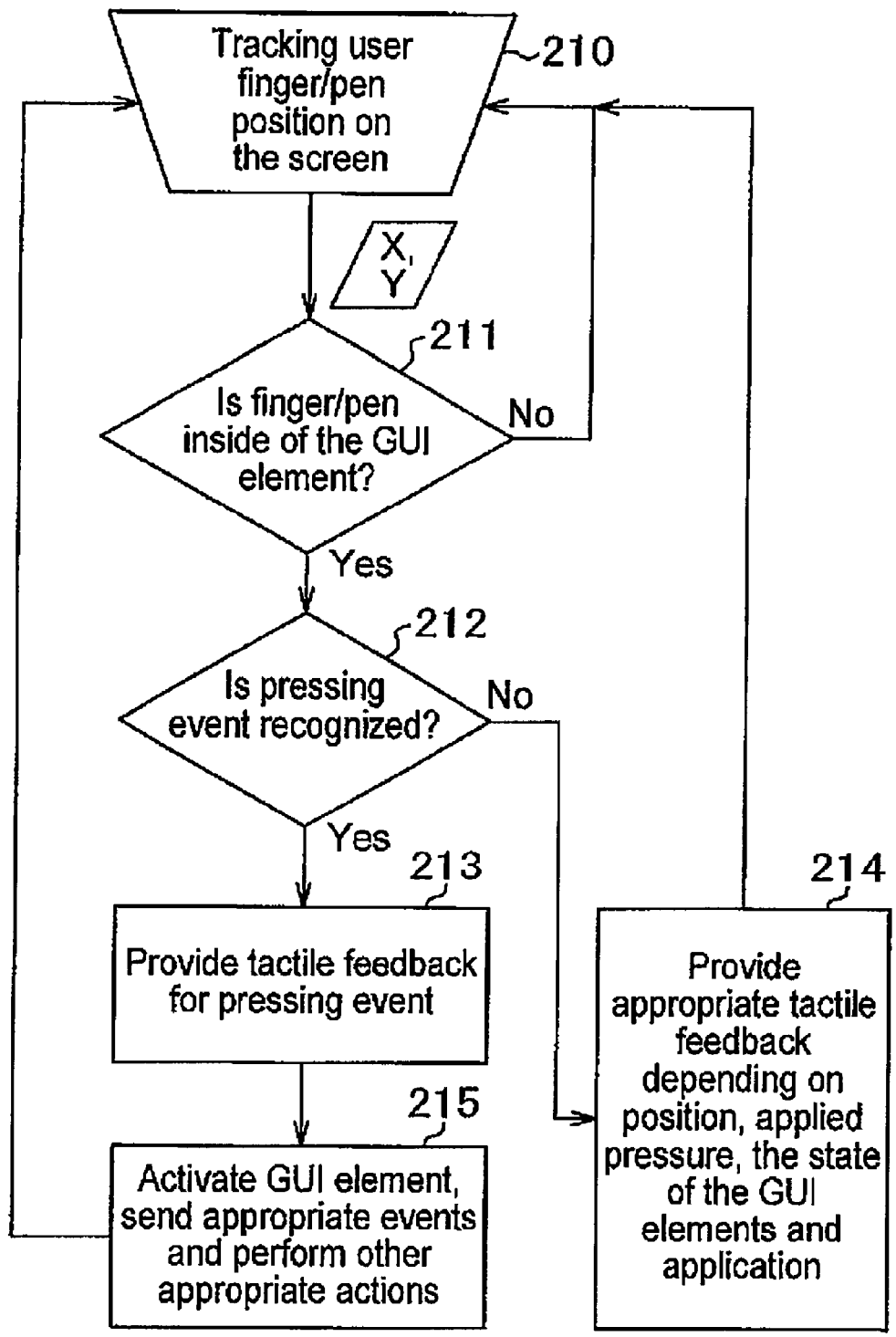
FIG. 4 is a flow chart showing steps of a user interface method according to an embodiment of the present invention.

FIGS. 3 and 4 illustrate a sliding operation in the present embodiment.

In the sliding operation, the user 2 slides a finger 200 across a GUI object 203 displayed on the screen 203. The GUI object can be a button, sliders, hyperlink or any image.

Upon detecting the user's touch, the 2D position sensing unit 104 starts tracking and keeps track of the user's finger or pen-type device position on the screen (Step 210). When a certain hotspot 203b or boundary element 203a, which forms part of the GUI object, is crossed by the finger 200 (Step 211), it is determined if there is any pressing event is recognized (Step 212). The hotspot of GUI object will be described below in detail with FIG. 5(a)-(c). The pressure sensing unit 105 monitors the pressure of the user's finger or pen-type device applied to the screen. The pressing event is recognized, for example, if the pressure more than a predetermined value is detected.

In the present embodiment, even if the pressing event is not recognized, the tactile feedback generating unit 102 provides the user 2 with the haptic feedback 201 or 202 (Step 214), as an indicator that the user 2 has touched or selected the GUI object 203. Accordingly, the user 2 can feel the GUI objects on the screen without activating them.

If the pressing event is recognized in Step 212, the tactile feedback generating unit 102 generates and provides another haptic feedback different from the one provided in the event of no pressing, i.e. when GUI elements was only selected (Steps 213, 215). Accordingly, it is possible to let the user 2 knows that the selected GUI object 203 is activated with the haptic feedback.

In the present embodiment, the different haptic feedbacks are provided to distinct the logical states of GUI object, namely "selected state" and "activated state". Alternatively, a visual feedback may be provided in addition to the haptic feedback. The visual feedback may include changing images of the selected GUI object in color or brightness or shape.

FIGS. 5(a)-5(c) illustrate an example of actuating operation with a button-type GUI object displayed on the screen. The present example describes the same situation as on FIG. 3, except that in the present example, instead of sliding over the button without actuating it, the user actually actuates the button.

Figure 5:
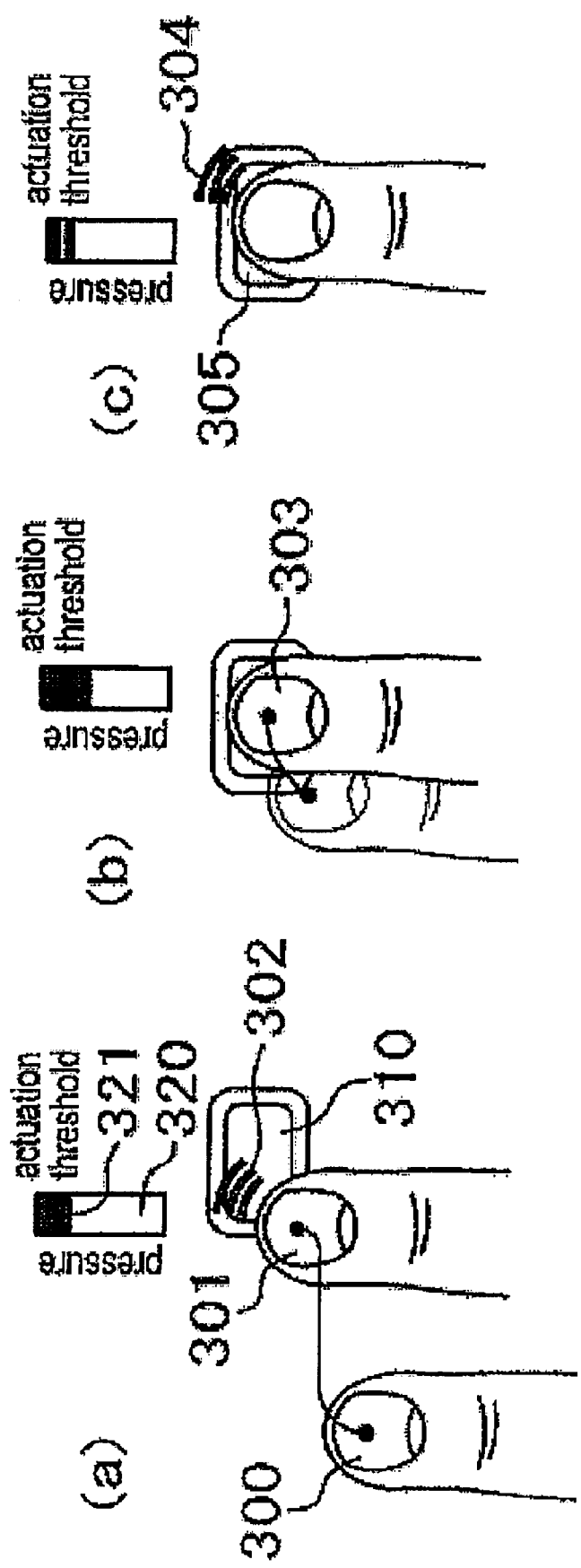
FIG. 5(*a*) is an explanatory illustration of a user interface method according to another embodiment of the present invention for a case where a pressing event is recognized.

The user 2 slides a finger from the initial position 300 toward the GUI object 310 (FIG. 5(a)). When the user 2 intersects a hotspot or boundary of the GUI object 310 and the pressure value is below an actuation threshold value, the apparatus provides a tactile feedback 302 to allow the user 2 to "feel" the GUI object 310. The pressure applied to the screen may be visually presented on the screen in an image 320 with an indication 321 of the actuation threshold as shown in FIG. 5(*a*).

In FIG. 5(*b*), the user 2 continues to slide the finger until the finger is inside 303 of the GUI object 310 and the pressure is below the actuation threshold. The user 2 then presses the GUI object 310 stronger and increases the pressure value above the actuation threshold 321 as shown in FIG. 5(*c*), the GUI object 310 is actuated and tactile feedback 304 is provided as well as visual feedback 305 to inform the user 2 that the GUI object 310 was selected and actuated.

Alternatively, an additional step for confirming the completion of actuating operation, such as adding another pressure threshold or detecting releasing of the finger, may be added to avoid accidental actuation. An example of additional pressure threshold for confirmation will be described below with FIG. 11.

There is a number of variations in relation to the actuation events, which may be utilized in the present embodiment.

One variation of the actuating techniques would require the user 2 to hold the finger without movement within the GUI object 310 for a certain amount of time before the apparatus 1 can register the activation. In such technique, the user 2 should stop the finger for a small period of time inside the GUI object 310 and then press stronger to actuate the GUI object 310. The user 2 can easily find the GUI object 310 when the finger slides over the GUI object 310 by being provided the tactile feedback on the boundaries of the GUI object 310 as described above. This technique is useful to separate the accidental activation of the GUI object when the user 2 slides finger across it.

Another variation of the actuating technique address a case when the user 2 slides into the GUI object 310 with pressure already above the actuation threshold. In this case the following possibilities (or their combination) may be considered:
 (i) the GUI object 310 is immediately actuated;
 (ii) the GUI object 310 is not actuated; and
 (iii) the GUI object 310 is not actuated but the apparatus 1 is tracking the pressure value and attempt to recognize an actuation event.

In case (ii), the GUI object 310 provides a normal tactile feedback. To actuated the GUI object 310, the user 2 first decreases the pressure applied on the GUI object 310 to bring it below the actuation threshold 321, and then press stronger again over the actuation threshold 321.

Figure 6:
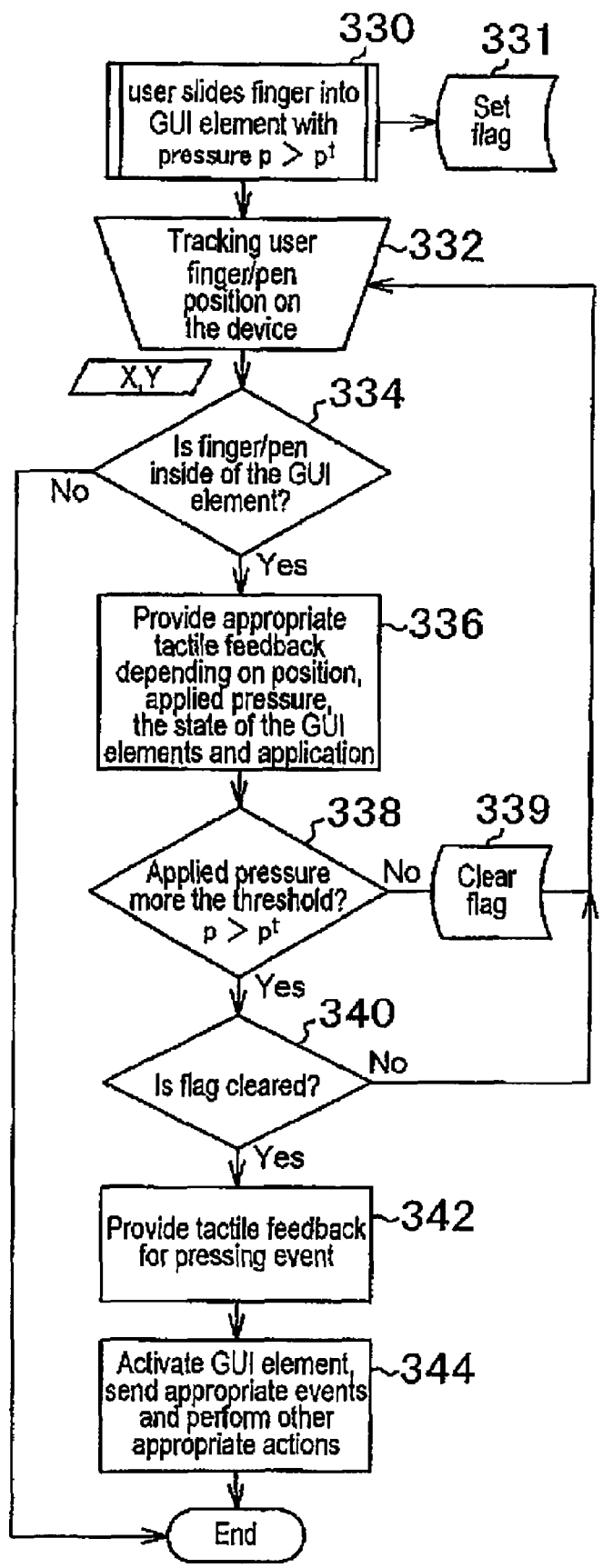
FIG. 6 is a flow chart showing steps of a user interface method according to another embodiment of the present invention.

FIG. 6 presents a flow chart how such interaction of case (ii) may be realized.

In this flow, the user 2 slides the finger into the GUI object 310 with the pressure p, which is above the actuation threshold pt (Step 330) and a flag is set to indicate this initial condition (Step 331). The position of the finger is tracked and checked if the finger is inside the GUI object 310 (Steps 332, 334). If the finger is determined to be inside the GUI object 310, the appropriate tactile feedback is provided to let the user know the finger is inside of the GUI object 310 but the GUI object 310 is not yet actuated (Step 336).

In case (ii), the pressure is detected again to see if it is above the actuation threshold pt (Step 338). If the pressure is equal or less than pt, the flag is cleared (Step 339) and the flow returns to Step 332 for attempting to recognize the pressing event. If the pressure is above pt, it is further checked if the flag was cleared (Step 340). If the flag was not cleared yet, the flow returns to Step 332. If the flag was cleared, the apparatus 1 recognizes the pressing event and provides the tactile feedback accordingly (Step 342). In response to the pressing event, the apparatus 1 sends commands for appropriate events and/or performs other appropriate actions, which correspond to the GUI object 310 (Step 344).

In case (iii), the GUI object 310 is not actuated but the apparatus 1 is tracking the pressure value and attempt to recognize an actuation event, i.e. some gesture that allows the user to specify that the GUI object 310 should be actuated. Such gesture event could be for example, impulse-like increase of pressure, i.e. the user quickly presses and releases the GUI object. A user interface software may be utilizes to recognize a spike in the pressure applied to the GUI object 310 and treat it as an actuation event.

In the present embodiment, the hotspot area associated with the GUI object may be arbitrary designed, thereby enabling to provide the user 2 a tactile feedback when the finger crosses this hotspot area. For example, as shown in FIG. 7(*a*), the hotspot area 501 may be provided inside of the GUI button 500 for presenting a tactile feedback when the user slides the finger inside of the GUI button 500.

Figure 7:
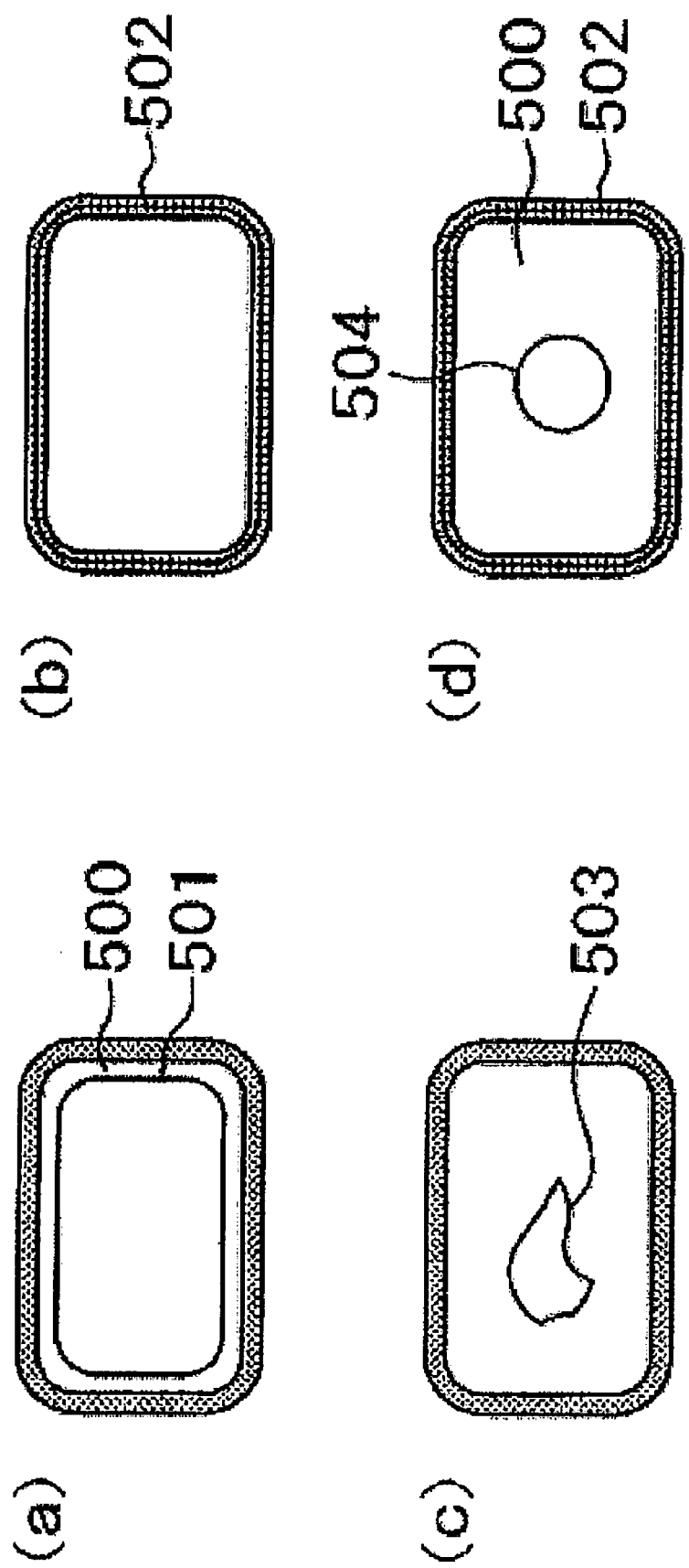
FIG. 7(*a*) is a schematic diagram showing an example of hotspot in a GUI object.

Another example of such hotspot is a boundary 502 of the GUI object 500 as shown in FIG. 7(*b*). Alternatively, the hotspot may have any arbitrary shape such as an area 503 as shown in FIG. 7(*c*). The GUI object 500 may have several hotspots. For example, in FIG. 7(*d*), there are two hotspots 502 and 504: first is the boundary 502 the GUI object 500 and second is the center 504 of the GUI object 500. Consequently, the tactile feedback will be provided when the user 2 slides the finger into the GUI object and then when the user slides the finger into the center. Any other configuration may be employed as long as such hotspot can indicate directly or indirectly a position or area of the GUI object to the user 2 via the tactile feedback.

The tactile feedback may be provided only when the user slides the finger into the hotspot and is not provided when the user slides outside of the hotspot. This variation for presenting the tactile feedback can be useful when the user 2 slides a finger quickly over a GUI object and the resulted feedback is too strong or confusing.

The interaction techniques can be further extended to provide a continuous tactile feedback to the user 2 while the finger is inside of the hotspot. For example, as long as the finger is inside of the hotspot, the tactile feedback of continuous wave shape may be provided.

The tactile feedback may be generated in various forms such as the followings:
(1) A continues and constant tactile wave shape; e.g. a vibration of the constant frequency is provided while the user's finger is inside of the GUI object. The parameters of the tactile feedback are constant and do not depend on the position of the finger inside of the GUI object or the pressure applied by the user on the GUI object.
(2) A dynamic tactile wave shape where tactile feedback parameters (e.g. frequency, amplitude, intensity, etc) are a function of the pressure applied by the user on the GUI object; The dependency can be
 (a) a step function, e.g. when the user 2 presses a button-type GUI object, such that tactile feedback changes in discreet steps; or
 (b) the continuous dependency between feedback and pressure applied, e.g. the stronger the user presses the button the higher the vibration frequency can be or the amplitude of the vibrations. In the simplest case, the intensity of tactile feedback increases as the user presses stronger. Any other function may be used to map pressure into tactile feedback intensity.

The tactile feedback may also be generated in accordance with any other parameter or multiple parameters that define the tactile waveshape.

Another variation of the tactile feedback may be provided when the user 2 changes the pressure inside of the GUI object. In this variation, when the user 2 places the finger inside of the GUI object and presses on it, the tactile feedback is provided for each incremental change in the pressure applied. The incremental change may be either increasing or decreasing.

Figure 8:
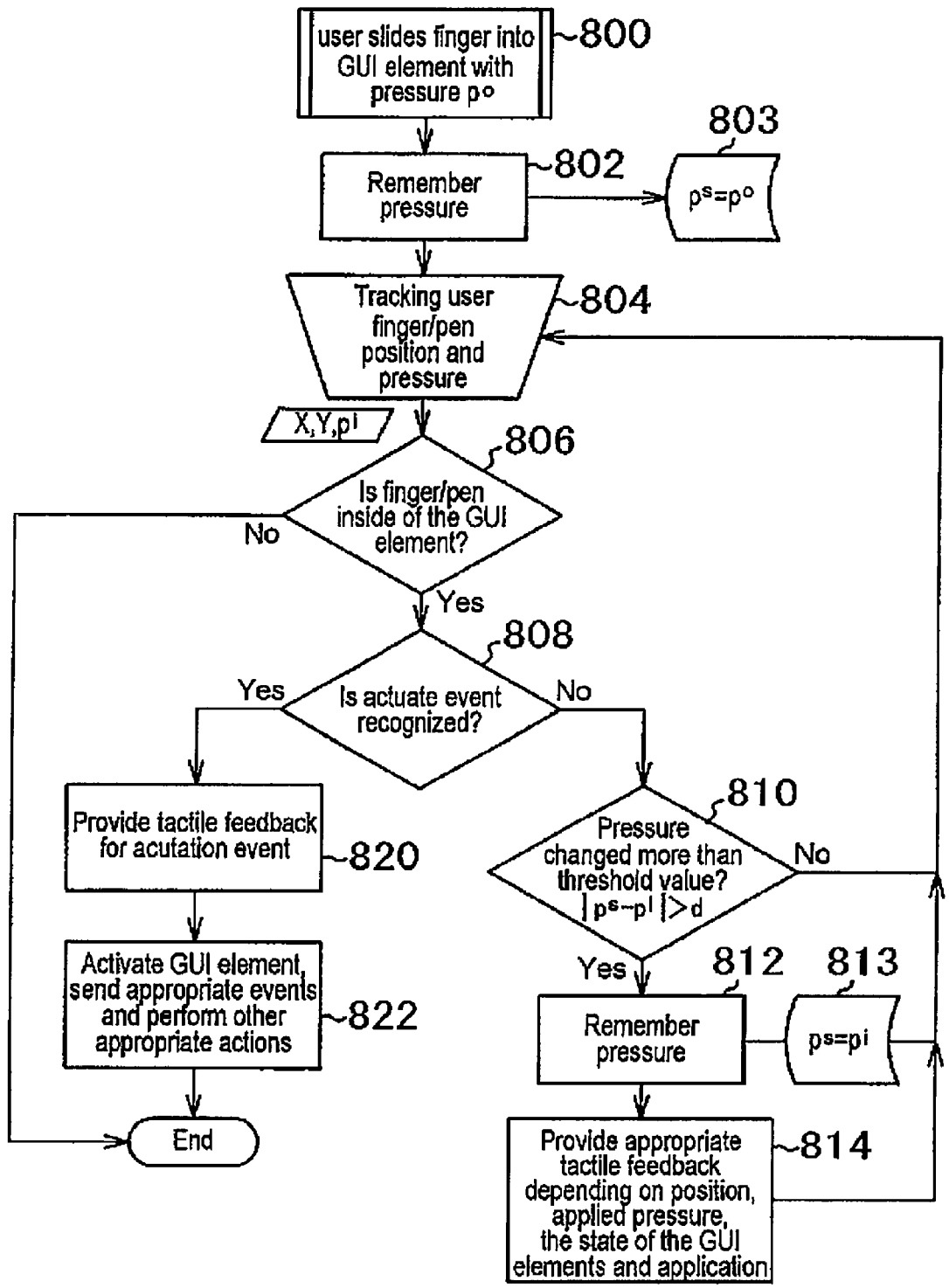
FIG. 8 is a flow chart showing steps of a user interface method according to still another embodiment of the present invention.

FIG. 8 provides an example of interaction flow for such variation of the tactile feedback. In this example, the user 2 slides the finger into a GUI object with the pressure p0 (Step 800). This initial pressure is detected and stored as variable ps (Steps 802, 803).

The apparatus 1 tracks the finger's position/pressure and checks if the finger is inside of the GUI object (Steps 804, 806). If the apparatus 1 determines that the finger is not inside of the GUI object, the flow proceed to end. If the finger is inside of the GUI object, the apparatus 1 further determines if the actuation event is recognized (Step 808).

If the actuation event is not recognized, the apparatus further determines if the pressure applied to the GUI object changed more than a preset threshold value d (Step 810). If the pressure changed more than the threshold value d, the current pressure is registered (Steps 812, 813) and the appropriate tactile feedback is provided depending on the position, the applied pressure, the logical state of the GUI object (Step 814). If the actuation event is recognized, the apparatus 1 provides the tactile feedback for the actuation event (Step 820), and then activates GUI object, sends a command for appropriate events and/or performs other appropriate actions (Step 822).

Alternatively, the tactile feedback may be provided when the user moves the finger within the GUI object, i.e. the change in x-y coordinates creates tactile feedback impulse. For example, in simplest case, every time the user 2 moves the finger within the GUI object and changes the position by a certain distance d, a tactile click (or other tactile feedback wave shape) may be provided. Further, the tactile feedback may also be correlated with amount of pressure applied on the screen. According to this tactile feedback generation scheme, various textures of the GUI object may be simulated by changing distance d or direction thereof. The threshold value d for evaluating the size of the change may be absolute or relative value.

Figure 9:
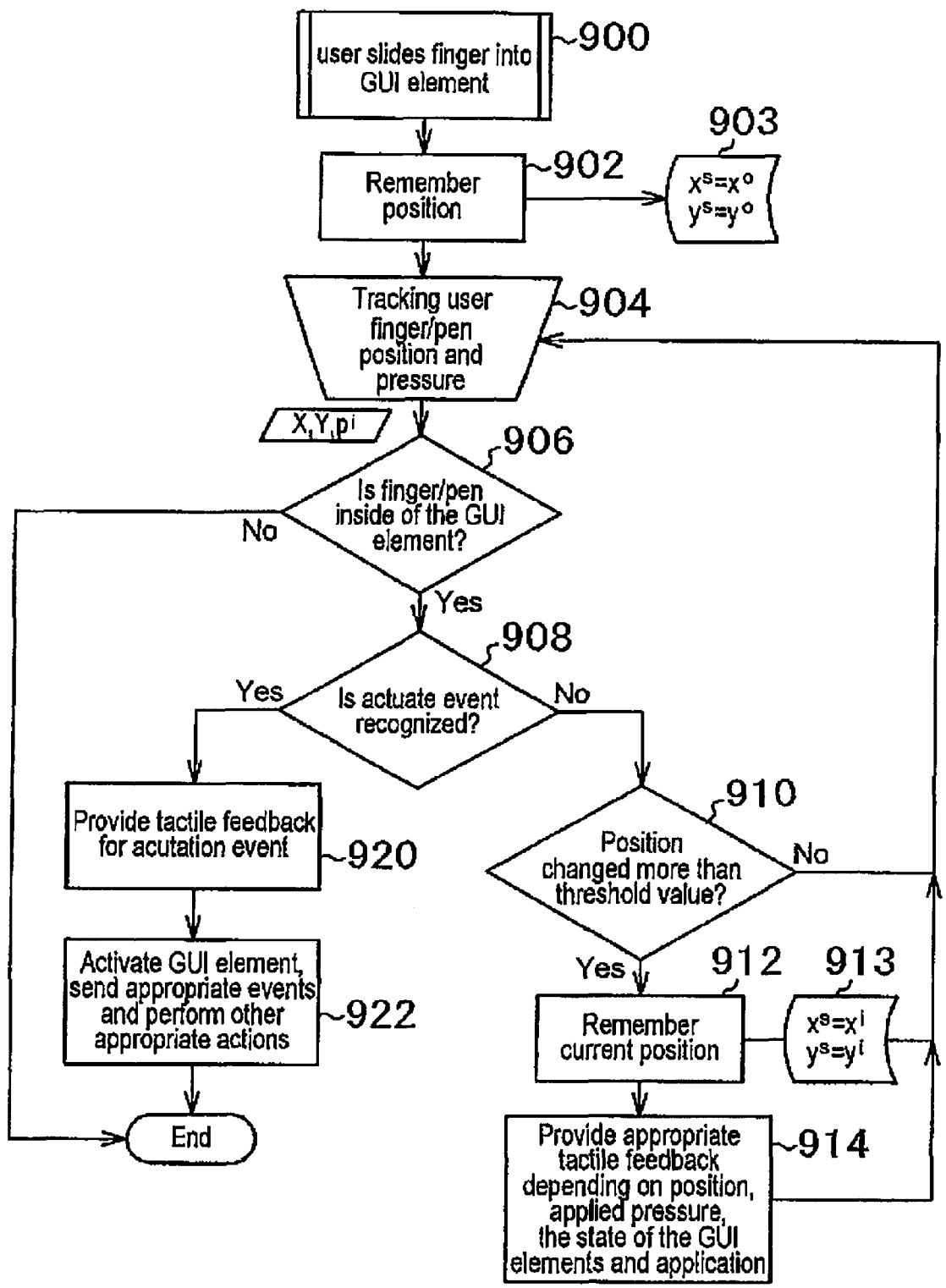
FIG. 9 is a flow chart showing steps of a user interface method according to another embodiment of the present invention.

FIG. 9 provides another example of interaction flow. In this example, the user 2 slides the finger into a GUI object (Step 900). This initial position is detected and stored as xs and ys (Steps 902, 903).

The apparatus 1 tracks the finger's position/pressure and checks if the finger is inside of the GUI object (Steps 904, 906). If the apparatus 1 determines that the finger is not inside of the GUI object, the flow proceed to end. If the finger is inside, the apparatus 1 further determine if the actuation event is recognized (Step 908).

If the actuation event is not recognized, the apparatus 1 further determines if the position of the finger changed more than a preset threshold value d (Step 910). If there is the position change more than the threshold value, the current position is registered (Steps 912, 913) and the appropriate tactile feedback is provided depending on the position, the applied pressure, the state of the GUI object (Step 914). If the actuation event is recognized in Step 908, the apparatus 1 provides the tactile feedback for the actuation event (Step 920), and then activates GUI object, sends a command for appropriate events and/or performs other appropriate actions (Step 922).

Figure 10:
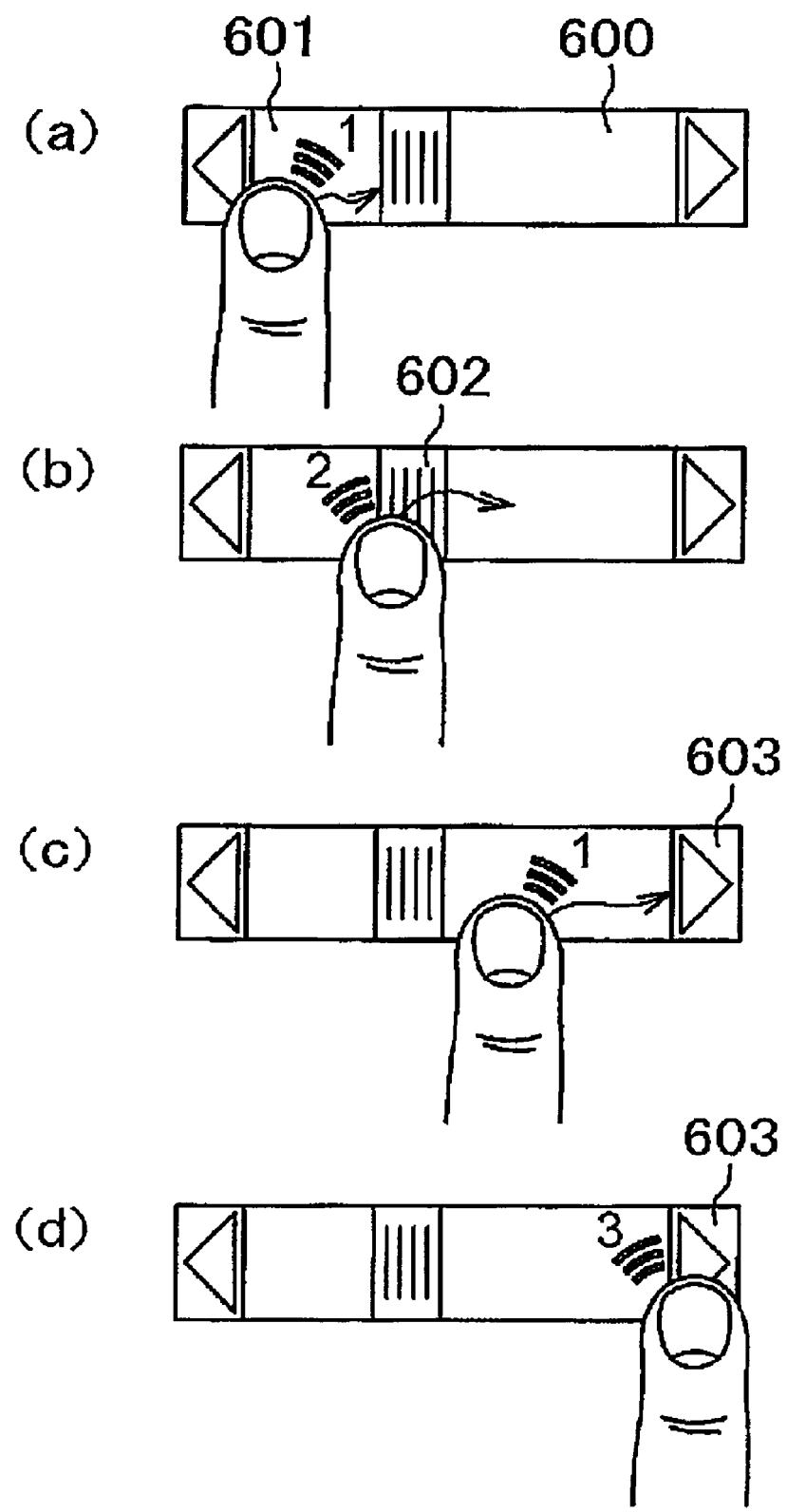
FIG. 10(*a*) is an explanatory illustration of a user interface method according to an embodiment of the present invention for a slider-type GUI object.

The tactile feedback may also be provided not only depending on the position but also which sub-component of GUI element the user is interacting with. FIGS. 10(*a*)-(*d*) demonstrate an example of such a case for a slider-type GUI object 600. It is assumed that the apparatus 1 can support three types of tactile feedback, that are referred to as tactile feedback type 1, 2 and 3.

On FIG. 10(*a*), the user touches the slider-type GUI object 600 in a part 601, which is a background part of the slider object 600. As the user moves the finger across that part, the tactile feedback type 1 is presented to the user. On FIG. 10(*b*), the user's finger slides over a slider handler 602 and the tactile feedback changes to the type 2, and then when the user goes over the slider handler 602 and back to the background of the slider-type GUI object 600, the tactile feedback changes back to the type 1, as shown in FIG. 10(*c*). Finally the user's finger moves to the slider end control 603, and then the tactile feedback changes to the type 3 (FIG. 10(*d*)). At that point the user may release the finger or press stronger to execute scrolling action. Other types of the tactile feedback to composite objects of the GUI may be employed so as that the user can be felt when the user slides over them without activating them. According to the present example, the user can recognize and operate even if the GUI objects have composite or complex structures.

After the user touches the GUI object, the user can activate it, for example, by pressing it harder.

Alternatively, the actuation of the GUI object may be recognized when the GUI object is pushed through a certain threshold of pressure or confirmation threshold. In this actuating scheme, the tactile feedback is provided twice: 1) when the actuation threshold is passed and 2) when the confirmation threshold is passed.

Figure 11:
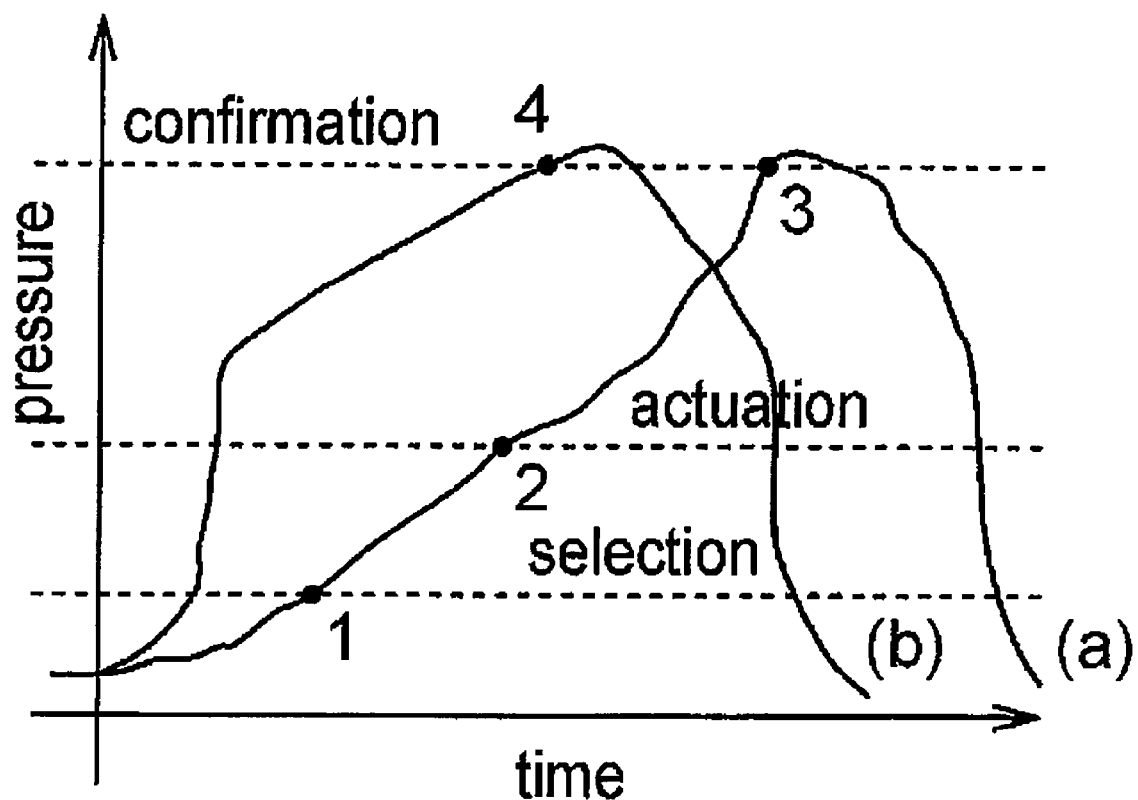
FIG. 11 is a graph showing changes of pressure applied by a user with time during a pressing event of a user interface method according to another embodiment of the present invention.

FIG. 11 demonstrates an example in which several thresholds are used in actuation and providing the tactile feedback. As the user touches and pushes the GUI object to pass a selection threshold, a tactile feedback is provided (Point 1 of Curve (a)) without actuating the GUI object. The user presses further to pass the actuation threshold where a different tactile feedback is provided (Point 2). In this example, however, the GUI object is not actuated yet. To actuate the GUI object, the user should press further to the confirmation threshold that also provides still another tactile feedback (Point 3).

The reason for providing this additional threshold or confirmation threshold is to avoid accidental activation of the GUI objects.

In the example described above, if the user pressed GUI objects very quickly, the multiple feedbacks may be presented, distracting and hamper the user interaction. In such a case, the tactile feedback may be linked to the speed with which the user pressed the GUI object. In other words, if the user presses the GUI object very quickly, then some of the tactile feedbacks corresponding intermediate thresholds will not be presented.

An example of such pressure change is presented as a curve (b) of FIG. 11. If the user presses quickly or a time constant of the pressure change is shorter than a preset value, the tactile feedbacks for selection and actuation thresholds are not presented. In this example, the user 2 is presented with the tactile feedback only at the confirmation level (Point 4 of Curve (b)).

In the embodiments described above, visual feedback on the GUI object and/or audio feedback may also be presented. Further, such feedbacks may also be correlated with tactile feedback and/or pressure input by the user or combination thereof.

In the forgoing examples, the interaction techniques are described when the user is sliding the finger across the screen to reach the GUI object. Alternatively, there is a case where the interaction starts by directly operating or pressing the GUI object. In this case, most of the interaction techniques of the embodiments according to the present invention may be applied, and the tactile feedback may be provided to the user to separate the selection state and the actuation state of the GUI object.

The forgoing examples of the present invention may be applicable to various GUI objects, in particular the examples may relate to buttons, sliders, radio buttons, check box, toolbars, dialog box, graphical dial, borders of the windows, and other GUI objects.

In the previous descriptions, the various examples of the apparatus 1 are described with the pressure sensing unit 105 that measures a pressure value. However, many of the examples of the present invention or simplified version of the examples may also be implemented only with recognizing two modes of user's input operation: a) strong push (pressing or actuation event) and b) light push or sliding (touching or selection event). These two modes may be recognized by any pressure sensor or pressure sensitive device that can directly or indirectly differentiate the strong push and the light push applied by the user.

For example, a device configured to measure the level of noise in a signal from the 2D position sensing unit 104 may be used for differentiating the strong push and the light push. When pressure applied to the touch screen is low, the noise level significantly increases due to, for example, finger tremor and/or mechanical shattering of the device, etc. In touch screens of related art, simple low-pass filters are used to remove these artifacts. In other words, the state of high-noise may be easily identified by using any signal processing unit that measures such noise level. Accordingly, in one embodiment of the present invention, the apparatus 1 may be provided with the device including a signal processing unit to detect this state of high noise, which may be considered such that the pressure applied by the user finger is low, meaning that this is the sliding or light push. According to such configuration, the examples of interaction schemes described above may be implemented without using any dedicated pressure sensitive device.

The apparatus 1 described above may be used in mobile phones, PDAs, other small portable devices, or terminal devices that displays GUI objects on their touch screens to prompt user's inputs.

In still another embodiment of the present invention, tactile feedback is provided by embedding tactile feedback elements into a touch screen. A user input includes pressure applied to screen, and the tactile feedback provided to the user is differentiated depending on the pressure applied by the user on GUI objects and the current state of the GUI objects.

In another embodiment of the present invention, there is provided a computing interactive apparatus including:
a) a touch-sensitive screen, that computes X-Y positions of the user finger touching the screen allowing to interact with a graphical user interface and graphical images presented on the screen;
b) tactile actuators embedded into the touch screen, so that the haptic feedback can be provided when the user is touching the screen surface with their fingers;
c) a pressure sensing device embedded in to the touch screen, that measures pressure that user applies to the screen when touching it;
d) computing and control components to produce an arbitrary haptic sensations on the touch screen;
c) graphical user interface (GUI) visual components and underlying control software;
d) control software techniques that correlate i) user input, captured by touch screen, (i.e. where the user touches the screen, which GUI components are actuated), ii) pressure applied to the screen by the user finger and (iii) the logical state of the interactive objects with dynamic tactile feedback presented to the user.

According to the foregoing embodiments of the present invention, there is provided a user interface method and apparatus including a display device and a touch panel device, which allow a user to have interaction operations similar to interaction with real physical buttons.

According to the foregoing embodiments of the present invention, there is provided a user interface method and/or apparatus which enable a user to feel graphical user interface objects displayed on a touch-screen of display, before choosing the one that the user wants to interact with.

According to the foregoing embodiments of the present invention, there is provided a user interface method and/or apparatus which allow for more natural interaction as well as easier blind interaction.

While the present invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the scope of the invention.

The invention claimed is:

1. An apparatus including a display section with a touch screen, the touch screen being adapted to display at least one graphical user interface object and detect a touch position on the touch screen, the touch position being inputted with a user's finger or a pointing device, the apparatus comprising:
a haptic feedback generating unit attached to the touch screen and adapted to generating haptic feedback;
a pressure sensing unit attached to the touch screen and adapted to detect pressure applied to the touch screen; and
a controller section adapted to control and drive the display section; wherein
the graphical user interface object displayed at a display location on the touch screen has a plurality of logical states, the display location defined by a boundary of the graphical user interface object,
the controller section determines a current logical state of the graphical user interface object using a history of detected touch positions and a history of detected pressure values, the current logical state of the graphical user interface object includes at least one of a selected state and an actuated state,
the controller section further determines a form of the haptic feedback to be generated depending on (i) the detected touch position, (ii) the detected pressure value and (iii) the determined current logical state of the graphical user interface object, and
the haptic feedback generating unit further applies, to the touch screen corresponding to the display location of the graphical user interface object upon determination by the controller that at least the detected touch position is within the boundary of the graphical user interface object, a first predetermined force pattern to the touch screen upon determination that the current logical state of the graphical user interface object is the selected sate, and a second predetermined force pattern different from the first predetermined force pattern upon determination that current logical state of the graphical user interface object is the actuated state.

2. The apparatus according to claim 1, wherein:
the logical states of the graphical user interface object include at least a selected state and an actuated state;
the controller section determines that the graphical user interface object is in the actuated state if a pressing event is recognized; and the controller section recognizes the pressing event using a history of the detected pressure value.

3. The apparatus according to claim 1, wherein:
the logical states of the graphical user interface object include at least a selected state and an actuated state; and
the controller section determines that the graphical user interface object is in the actuated state if: (i) the touch position is inside of the graphical user interface object; and (ii) the detected pressure is more than a preset actuation threshold value.

4. The apparatus according to claim 1, wherein:
the logical states of the graphical user interface object include at least a selected state and an actuated state; and
the controller section determines that the graphical user interface object is in the actuated state if: (i) the touch position is inside of the graphical user interface object; and (ii) a history of the detected pressure satisfies a preset actuation condition.

5. The apparatus according to claim 1, wherein:
the haptic feedback generation unit includes a single or plurality of piezoelectric elements; and
at least one of the piezoelectric elements is used for generating the haptic feedback and detecting the pressure applied by the user.

6. The apparatus according to claim 1, wherein:
the controller section further controls either a frequency of the haptic feedback, an amplitude of the haptic feedback or both amplitude and frequency of the haptic feedback simultaneously.

7. The apparatus according to claim 1, wherein:
the controller section controls the haptic feedback generating unit to generate a continuous haptic feedback as long as the touch position is inside of the graphical user interface object; and
the controller section changes the continuous tactile feedback in response to a change of the pressure applied to the touch screen, the change of the continuous haptic feedback depending on the current logical state of the graphical user interface object.

8. The apparatus according to claim 1, wherein:
the controller section controls the haptic feedback generating unit to generate a single burst of the haptic feedback when the touch position crosses over a hotspot predefined within the graphical user interface object.

9. The apparatus according to claim 1, wherein:
the controller section controls the haptic feedback generating unit to generate a single burst of the tactile feedback when the touch position or the detected pressure changes more than a preset threshold value.

10. The apparatus according to claim 1, wherein:
the graphical user interface object is formed with a plurality of sub-objects; and
the controller section controls the haptic feedback generating unit to generate different tactile feedbacks for different sub-objects thereof.

11. The apparatus according to claim 2, wherein:
the controller section determines that the graphical user interface object is in the activated state by using a plurality of pressure thresholds.

12. The apparatus according to claim 2, wherein:
the controller section differentiates a stronger push and a lighter push based on a noise level of a signal from the touch screen, the stronger push corresponding to the pressing event, the lighter push corresponding to sliding of the user's finger or pointing device.

13. The apparatus according to claim 1, wherein:
the controller section controls the display section to generate visual feedback in correlation with the haptic feedback.

14. The apparatus according to claim 1, wherein:
the logical states of the graphical user interface object include at least a selected state and an actuated state, the selected state being a state where the graphical user interface object is selected but not actuated, the actuated state being a state where the graphical user interface object is actuated;
the logical state is allowed to change to the actuated state after the selected state.

15. A graphical user interface method for a touch screen, comprising:
displaying a graphical user interface object at a display location on the touch screen, the graphical user interface object having a plurality of logical states, the display location defined by a boundary of the graphical user interface object;
detecting a touch position on the touch screen, at which a user's finger or a pointing device is touching;
detecting pressure applied on the touch screen when the touch position is detected; and
generating haptic feedback in response to the touching, a form of the haptic feedback being determined depending on (i) the detected touch position, (ii) the detected pressure value and (iii) a current logical state of the graphical user interface object;
wherein
the current logical state of the graphical user interface object is determined by using a history of detected touch positions and a history of detected pressure values, the current logical state of the graphical user interface object includes at least one of a selected state and an actuated state, and
the generated haptic feedback response is applied to the touch screen corresponding to the display location of the graphical user interface object upon determination that at least the detected touch position is within the boundary of the graphical user interface object, a first predetermined force pattern to the touch screen upon determination that the current logical state of the graphical user interface object is the selected state, and a second predetermined force pattern different from the first predetermined force pattern upon determination that current logical state of the graphical user interface object is the actuated state.

16. The graphical user interface method according to claim 15, further comprising:
determining the current logical state of the graphical user interaction object by detecting if there is a pressing event, the pressing event being recognized by using a history of the detected pressure value;
wherein the graphical user interface object is determined as in an actuated state if the pressing event is recognized.

17. The graphical user interface method according to claim 16, wherein:
the pressing event is determined if the history of the detected pressure value satisfies a preset pattern.

18. The graphical user interface method according to claim 15, wherein:
a single burst of the haptic feedback is generated when the detected touch position and/or the detected pressure changed more than a preset threshold value.

* * * * *